(No Model.)
J. FRENIER.
WHEEL.
No. 400,907.
Patented Apr. 9, 1889.
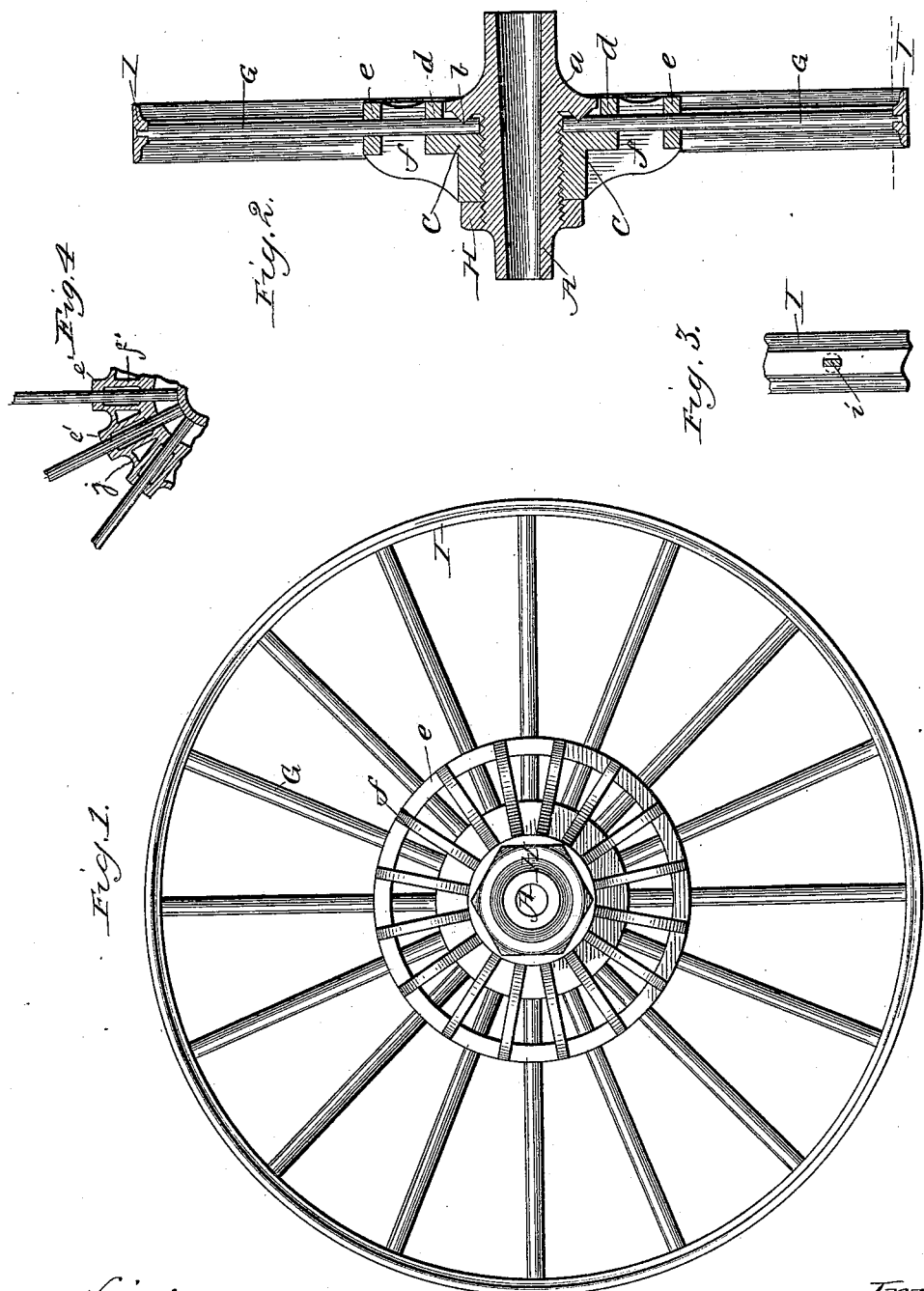
Witnesses,
Inventor
Joseph Frenier
By Wm H Lotz
Atty.

UNITED STATES PATENT OFFICE.

JOSEPH FRENIER, OF LA PORTE, INDIANA.

WHEEL.

SPECIFICATION forming part of Letters Patent No. 400,907, dated April 9, 1889.

Application filed August 7, 1888. Serial No. 282,191. (No model.)

*To all whom it may concern:*

Be it known that I, JOSEPH FRENIER, a citizen of the United States of America, residing at La Porte, in the county of La Porte and State of Indiana, have invented certain new and useful Improvements in Wheels, of which the following is a specification, reference being had therein to the accompanying drawings.

This invention relates to improvements on the wheel secured to me by Letters Patent of the United States dated March 17, 1885, being No. 313,931. The wheel described in these Letters Patent being provided with two sets of spokes placed angularly toward the hub makes it impracticable for some kinds of agricultural machinery—as, for example, for horse hay-rakes—because the hay catching in the spokes entangles between the two rows thereof; and therefore it has been the object of this my invention to produce a wheel that with a single set of spokes will produce equal strength and durability; and with that object in view my invention consists of the novel devices and combinations of devices hereinafter described and specifically claimed.

In the accompanying drawings, Figure 1 represents an elevation, and Fig. 2 a transverse section through the center, of the wheel. Fig. 3 is an elevation of the internal face of a piece of the rim, showing the manner of securing the end of the spoke thereto; and Fig. 4 is a modification of the construction of the wheel-hub.

Corresponding letters of reference in the several figures of the drawings designate like parts.

A denotes the hub-box of the wheel, being cast of metal and bored to fit upon the axle-journal. This hub-box has a flange, $a$, concentric therewith and provided with a circular sharp-edged projection, $b$, to its inward face. From flange $a$ outward the cylindrical portion of the hub-box is screw-threaded for entering and engaging the hub of the spoke-holder C, screw-threaded internally. This spoke-holder C, also cast of metal, has an annular flange, $d$, that surrounds the flange $a$ of hub-box A, and has a ring, $e$, connected to the hub and flange $d$ by a series of radial ribs, $f$. Both the flange $d$ and ring $e$ are concentric with hub-box A when the hub of the spoke-holder C is screwed thereon. Holes equal distances apart are cored or drilled in ring $e$ and flange $d$ to be radially in line for receiving the inner ends of spokes G, made of round or oval, straight, or tapered metal in a manner that each spoke is laterally held in two separated bearings to be laterally more rigid with the hub than by being inserted into a shallow socket only. The inner end of each spoke G is notched where it engages the sharp-edged circular projection $b$ of flange $a$ in a manner that with screwing the hub of the spoke-holder C upon hub-box A toward flange $a$ the inner ends of spokes G are clamped between the flange of the hub of spoke-holder C and the projection $b$ of hub-box A, whereby these spokes G are secured very firmly in the hub. A plain hexagon jam-nut, H, screwed upon hub-box A against the end of the hub of spoke-holder C, is to prevent the parts from disconnecting; but this jam-nut H may be dispensed with and the parts A and C may be secured by a pin or set-screw tapped through the hub of part C to enter the hub A, or may be secured by any other well-known device.

The rim I may be bent and welded of any suitable shaped metal, and for connecting the ends of spokes G therein without weakening the rim too much I flatten or swage the two opposite sides of the spoke end to form a flat rectangular tenon, and through the rim I punch longitudinally-oblong holes $i$, countersunk on the outside of the rim, into which the spoke-tenons are inserted and riveted at their outer ends. Heretofore the ends of the spokes were screw-threaded and tapped into the rim, whereby the rim was weakened too much transversely by cutting away the central body of the metal almost entirely, especially so in using narrow tires. The ring $e$ need not be continuously circular, but may be formed of bosses $e'$, connected one with the other by curved plates $j$ and to the flange $d$ each by two ribs, $f'$, as shown by Fig. 4.

It will be readily seen a wheel thus constructed with ring $e$ and rib-braces $f$ makes a strong brace for the one row of spokes G. The ring $e$ can be varied in diameter to accommodate the diameter of wheels for purpose intended, and will add stiffness, strength, and durability, and is cheaper to manufacture than most other constructions heretofore used for like purposes.

What I claim is—

1. The combination, with a metallic wheel hub-box having a flange and being screw-threaded, of the spoke-holder having a screw-threaded hub and provided with an annular flange and a concentric ring connected by ribs, both the flange and ring having holes radially in line for inserting and holding the spoke ends, substantially as set forth.

2. The combination, with a metallic wheel hub-box screw-threaded and provided with a rigid flange having a circular sharp-edged side projection, of the spoke-holder screwed upon such hub-box and provided with an annular flange and a concentric ring connected by ribs, both the flange and ring having holes radially in line for inserting and holding the metal spokes notched at their inner ends for engaging the sharp-edged side projection of the hub-box, substantially as set forth.

In testimony whereof I affix my signature in presence of two witnesses.

JOSEPH FRENIER.

Witnesses:
WM. H. LOTZ,
OTTO LUBKERT.